(12) United States Patent
Schultz et al.

(10) Patent No.: US 6,386,624 B1
(45) Date of Patent: May 14, 2002

(54) FRONT END ASSEMBLY FOR AN AUTOMOTIVE VEHICLE

(75) Inventors: John P. Schultz, St. Clair Shores; Andrew Billiu, Farmington Hills; Julie N. Brown, Dearborn, all of MI (US)

(73) Assignee: Plastech, Dearborn, MI (US)

( * ) Notice: Subject to any disclaimer, the term of this patent is extended or adjusted under 35 U.S.C. 154(b) by 0 days.

(21) Appl. No.: 09/182,719

(22) Filed: Oct. 29, 1998

(51) Int. Cl.[7] .................................................. B60J 7/00
(52) U.S. Cl. ....................... 296/194; 296/196; 296/197; 180/68.4
(58) Field of Search .................................. 296/193, 194, 296/196, 197, 203.01, 203.02; 180/68.4; 293/115

(56) References Cited

U.S. PATENT DOCUMENTS

| | | | |
|---|---|---|---|
| 3,044,822 A | * 7/1962 | Dean et al. ................. | 180/68.4 |
| 4,807,094 A | * 2/1989 | Mateos et al. ............... | 296/194 |
| 4,874,200 A | * 10/1989 | Nasu et al. .................. | 296/197 |
| 4,914,802 A | * 4/1990 | Takao et al. ................. | 296/196 |
| 4,940,281 A | * 7/1990 | Komatsu ..................... | 296/194 |
| 4,978,164 A | * 12/1990 | Nakamura et al. ..... | 296/203.02 |
| 5,123,695 A | * 6/1992 | Kanemitsu et al. ........ | 180/68.4 |
| 5,271,473 A | * 12/1993 | Ikeda et al. ................. | 180/68.4 |
| 5,358,304 A | * 10/1994 | Kanemitsu et al. ......... | 296/196 |
| 5,403,048 A | * 4/1995 | Ekladyous et al. ......... | 293/115 |
| 5,533,780 A | * 7/1996 | Larson et al. ............... | 180/68.4 |
| 5,575,526 A | 11/1996 | Wycech | |
| 5,658,041 A | 8/1997 | Girardot et al. | |
| 5,865,500 A | * 2/1999 | Sanada et al. ............... | 293/115 |

FOREIGN PATENT DOCUMENTS

DE 004307793 A1 9/1994

* cited by examiner

Primary Examiner—Joseph D. Pape
Assistant Examiner—Kiran B. Patel
(74) Attorney, Agent, or Firm—Bliss McGlynn & Nolan, PC

(57) ABSTRACT

A front end assembly (10) is provided for attaching components to a front end (16) of an automobile chassis (18) which eliminates the duplication of structure between a conventional grille opening reinforcement and grille, and incorporates several front end components into an integrated structure. The front end assembly (10) includes a stabilizer bar (12) adapted for attachment to the chassis front end (16), and a grille system (14) adapted for attachment to the chassis front end (16) and the stabilizer bar (12). Preferably, the area occupied by the stabilizer bar (12) on the chassis front end (16) is substantially less than the area occupied by the grille system (14), such that structure is not duplicated between the stabilizer bar (12) and the grille system (14). The grille system (14) has a grille (20) mounted therein, lamp canisters (22) defined on either end (24) thereof, and lamps (26, 28) mounted within the lamp canisters (22). Therefore, the grille system (14) allows several components to be attached to the chassis front end (16) as one integrated unit.

8 Claims, 4 Drawing Sheets

FRONT END ASSEMBLY FOR AN AUTOMOTIVE VEHICLE

TECHNICAL FIELD

This invention relates to a front end assembly for an automotive vehicle, and more particularly to a front end assembly which includes an integrated grille system and a stabilizer bar.

BACKGROUND ART

A grille opening reinforcement (GOR) is one of the most important components in the front end of today's automobile. Components such as the fenders, grilles, headlamps, and park/turn lamps are assembled to the GOR, which makes the GOR integral to front end fit and finish functions. The GOR provides attachments, locators, and structural support to the surrounding mating components. It also provides access for lamp bulb replacement, secondary hood latch release levers, and all other maintenance and repair requirements.

Arguably, the primary function of a GOR is to provide assembly plants with a controlled and predictable front-end build for their vehicles. An original equipment manufacturer (OEM) typically requires a GOR on all its vehicles because of the capability to coordinate the fit and finish of all front end exterior components. However, a disadvantage of conventional GOR designs is that much of the structure of the GOR is duplicated by the attached grille. Furthermore, each of the components listed above must be assembled to the GOR at an OEM assembly plant on the trim line, such that multiple operators and work stations are required.

SUMMARY OF THE INVENTION

Therefore, it is an object of the present invention to provide a front end assembly which eliminates the duplication of structure between a conventional GOR and a grille.

It is another object of the present invention to provide a front end assembly which incorporates several front end components into a single, integrated structure.

It is a further object of the present invention to provide a front end assembly which reduces cost and weight.

Accordingly, a front end assembly is provided for attaching components to a front end of an automobile chassis which eliminates the duplication of structure between a conventional grille opening reinforcement and grille, and incorporates several front end components into an integrated structure. The front end assembly includes a stabilizer bar adapted for attachment to the chassis front end, and a grille system adapted for attachment to the chassis front end and the stabilizer bar. Preferably, the area occupied by the stabilizer bar on the chassis front end is substantially less than the area occupied by the grille system, such that structure is not duplicated between the stabilizer bar and the grille system. The grille system has a grille mounted therein, lamp canisters defined on either end thereof, and lamps mounted within the lamp canisters. Therefore, the grille system allows several components to be attached to the chassis front end as one integrated unit.

The above objects and other objects, features, and advantages of the present invention are more readily understood from a review of the attached drawings and the accompanying specification and claims.

BEST MODES FOR CARRYING OUT THE INVENTION

Figure 1:
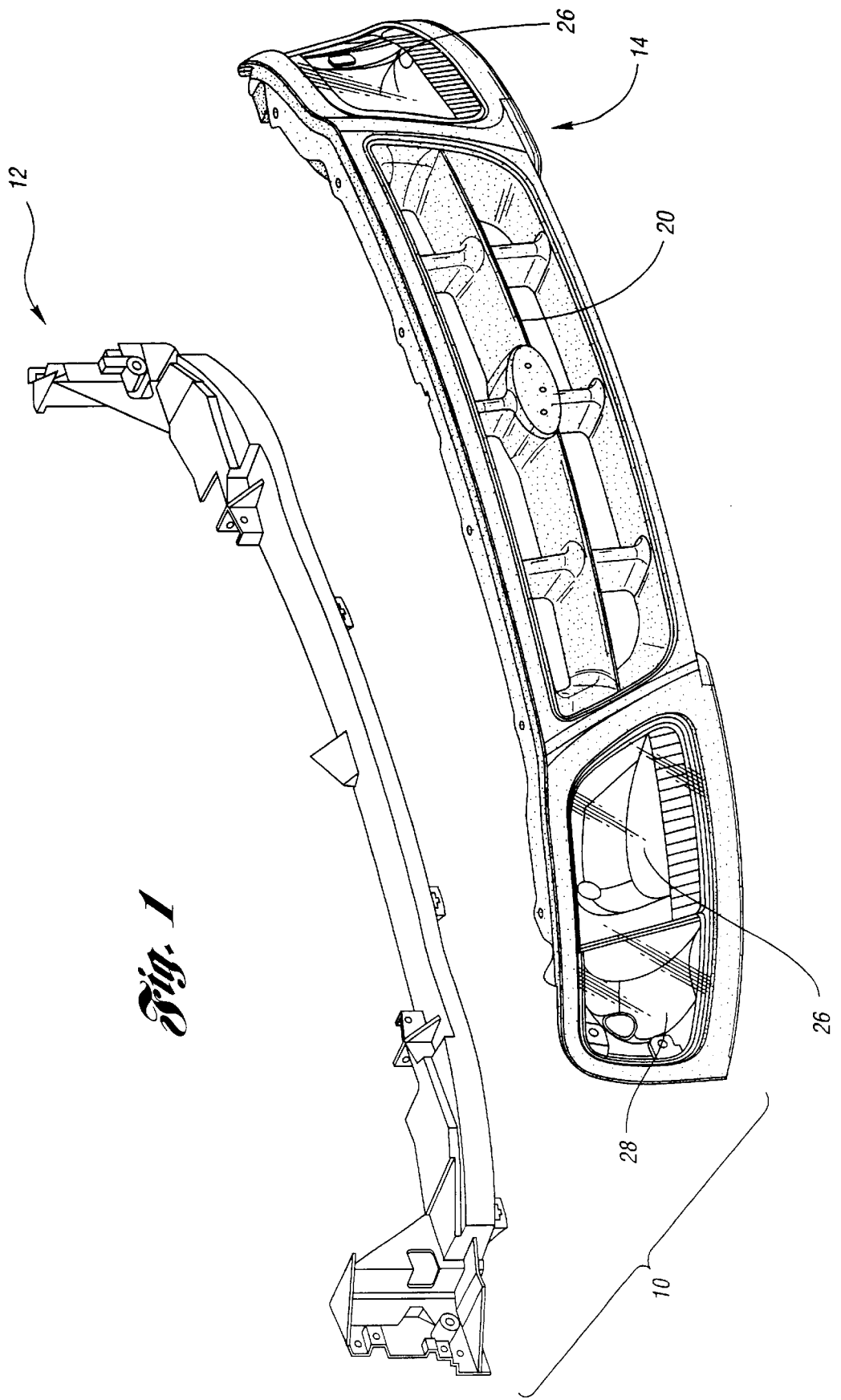
FIG. 1 is a perspective view of a front end assembly, comprising a stabilizer bar and a grille system, in accordance with the present invention.

The present invention provides a front end assembly, indicated by reference numeral 10 in FIG. 1, for attaching components such as a grille, headlamps, and park/turn lamps to the front end of an automobile chassis. Front end assembly 10 does not utilize a conventional GOR to mount components, but rather uses a stabilizer bar 12 and a grille system 14 for this purpose. Stabilizer bar 12 of the present invention eliminates the duplication of structure between a conventional GOR and grille, and grille system 14 of the present invention provides an integrated unit for mounting components to the front end of the automobile.

Figure 3:
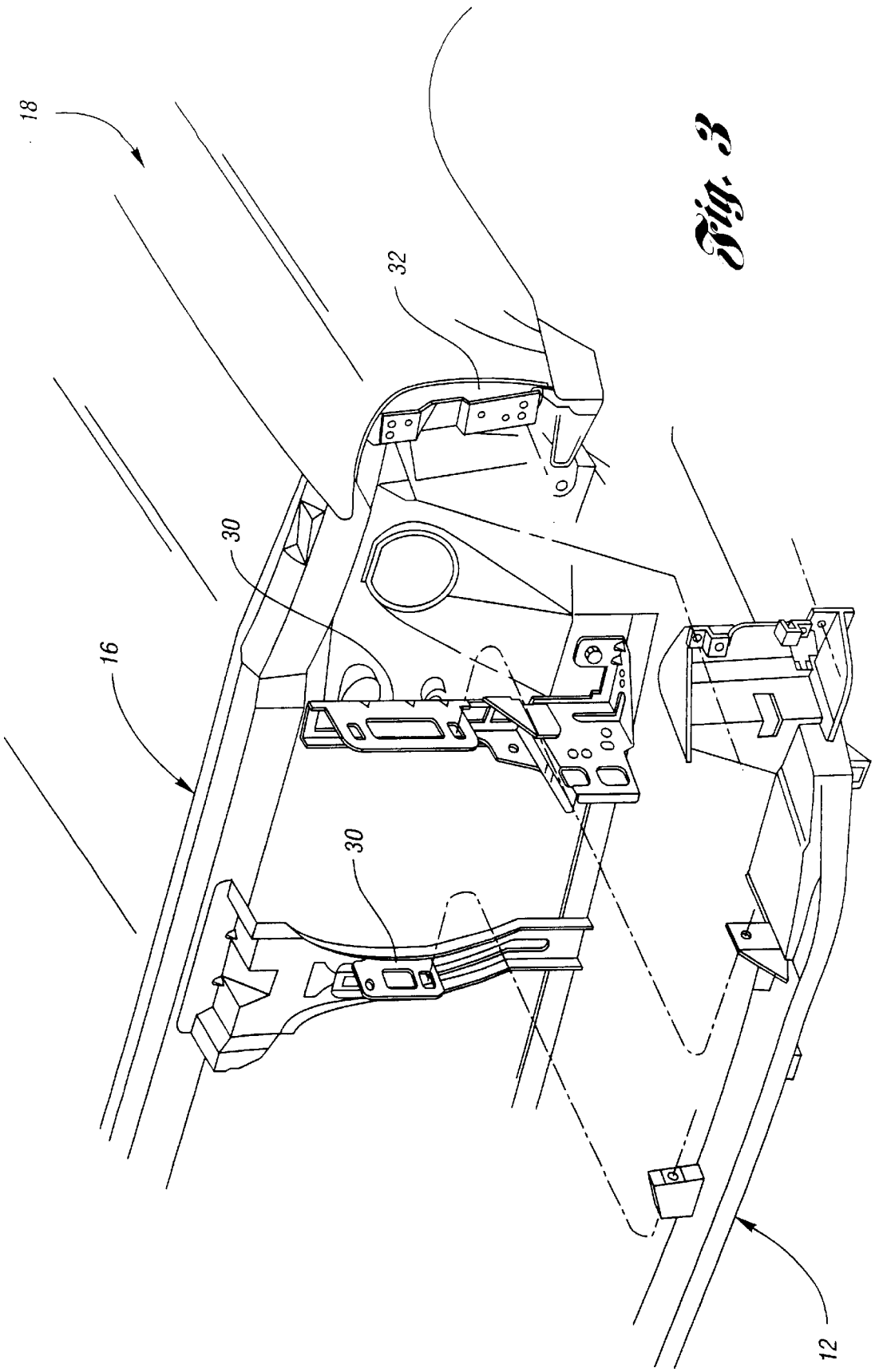
FIG. 3 illustrates the attachment of the stabilizer bar to the front end of an automobile chassis.
Figure 4:
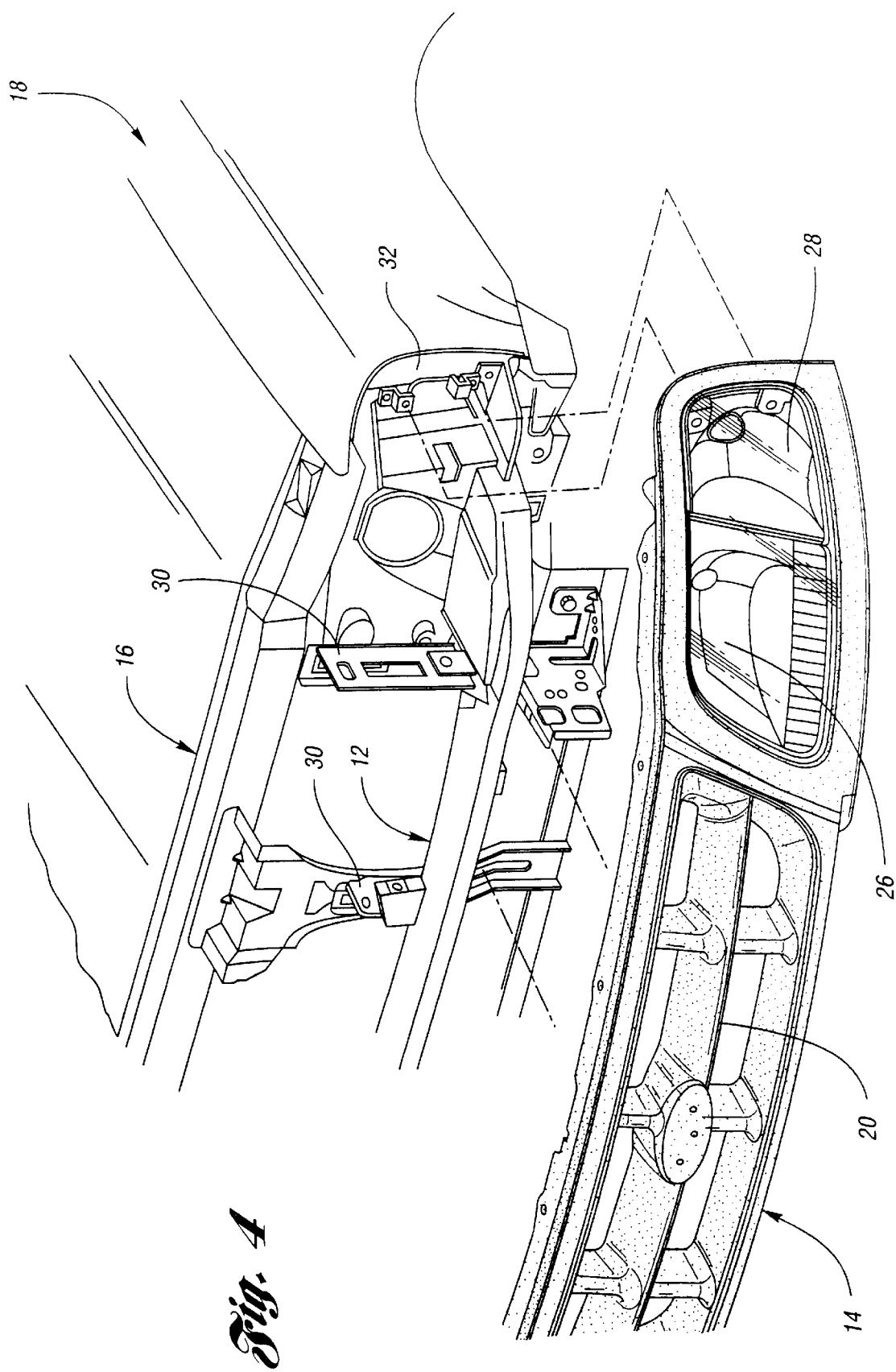
FIG. 4 depicts the attachment of the grille system to the chassis front end and the stabilizer bar.

Stabilizer bar 12 is substituted for a conventional GOR and is adapted for attachment to a front end 16 of an automobile chassis 18, as shown in FIGS. 3 and 4. Stabilizer bar 12 has an elongated structure, and preferably occupies an area on chassis front end 16 which is substantially less than the area occupied by grille system 14. In this manner, stabilizer bar 12 eliminates any duplication of structure, thereby reducing both cost and weight as compared with the combination of a conventional GOR and grille.

Stabilizer bar 12 is preferably molded with a class B surface, a "no show" surface, and is designed to satisfy an assembly plant's "E-coat" heat requirements and paint ovens. Stabilizer bar 12 also provides the OEM with a locating capability, in relation to the center line of a vehicle, for a fender (not shown) attached to chassis front end 16.

Figure 2:
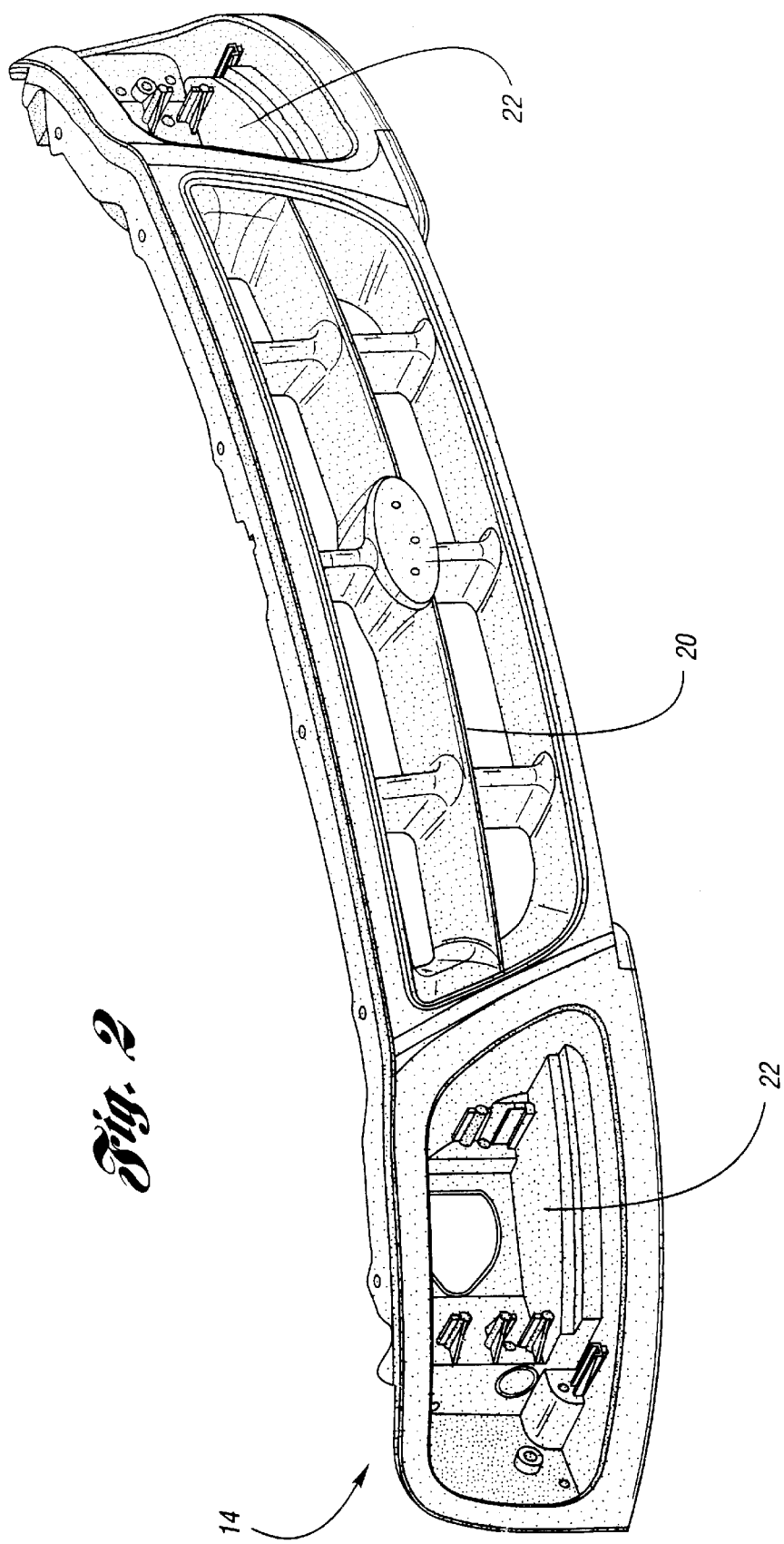
FIG. 2 shows the grille system prior to complete integration.

Grille system 14 of the present invention is adapted for attachment to chassis front end 16 and stabilizer bar 12 (FIG. 4), and preferably utilizes a one piece ABS design. As shown in FIGS. 1 and 2, grille system 14 has a grille 20 mounted therein, lamp canisters 22 defined on either end 24 thereof, and lamps, preferably headlamps 26 and park/turn lamps 28, mounted within lamp canisters 22. Therefore, grille system 14 incorporates grille 20 and lamps 26 and 28 into a single modular unit. Since lamp canisters 22 are molded into grille system 14, instead of into a conventional GOR, headlamps 26 and park/turn lamps 28 may be assembled to grille system 14 by an outside supplier in an ergonomically efficient environment, then sent to the OEM's assembly plant as an integrated unit.

In practice, chassis front end 16 typically embodies a radiator support and includes at least one attachment member affixed thereto. In a preferred embodiment, the attachment member comprises three spaced apart slip plane brackets 30 which are assembled to chassis front end 16, as depicted in FIGS. 3 and 4. Stabilizer bar 12 is then loose assembled to slip plane brackets 30 as well as outer fender attachments 32 provided on chassis front end 16, and fastened with nuts and bolts. Dashed lines in FIG. 3 indicate the locations at which stabilizer bar 12 is affixed by means for locating (such as nuts, bolts, rivets, screws and the like) to outer fender attachments 32, which then serves to locate the fender (not shown) in relation to the center line of the vehicle.

Using a conventional GOR, headlamps 26, park/turn lamps 28, and grille 20 must be shipped from suppliers to the OEM assembly plant in order to complete the trim and final assembly. The installation of left and right headlamps 26 and left and right park/turn lamps 28 to a GOR requires two operators at an assembly work station, one at each side of the vehicle. Installation of grille 20 to the GOR requires another operator at another work station.

In sharp contrast, using front end assembly 10 of the present invention, grille 20 and lamps 26 and 28 may be mounted to grille system 14 by a single supplier, and grille system 14 shipped from the supplier to the OEM assembly plant as an integrated unit. Requiring only one step, grille system 14 is installed to chassis front end 16 and stabilizer bar 12, typically via slip plane brackets 32 and outer fender attachments 34. Therefore, use of front end assembly 10 eliminates at least one complete work station and improves floor space utilization at the OEM assembly plant.

Alternatively, grille system 14 of the present invention may be integrated at a later point in the assembly process. Specifically, grille system 14 is capable of receiving a grille 20 which is mounted, rather than molded, therein. In addition, headlamps 26 and park/turn lamps 28 need not be installed into lamp canisters 30 prior to attaching grille system 14 to chassis front end 16. Therefore, components may be installed to grille system 14 at any time before or after grille system 14 is attached to an automotive vehicle.

It is understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

What is claimed is:

1. A front end assembly for attaching components to a front end of an automotive chassis having a pair of front fenders mounted thereto, the automotive chassis including a radiator support member; the chassis and radiator support member supporting a radiator, the front end assembly comprising:

a stabilizer bar attached to a front end of the chassis and between the front fenders, wherein the stabilizer bar locates components in relation to a centerline of the chassis; and a grille system attached to the chassis front end and the stabilizer bar wherein the stabilizer bar locates the grille system and front fenders in relation to a centerline of the chassis, the grille system having a grille mounted therein and provided with lamp canisters defined on either end thereof that are sized to receive lamps.

2. The front end assembly of claim 1, wherein the lamps include headlamps.

3. The front end assembly of claim 1, wherein the lamps include park/turn lamps.

4. The front end assembly of claim 1, wherein the area occupied by the stabilizer bar on the chassis front end is substantially less than the area occupied by the grille system on the chassis front end.

5. The front end assembly of claim 1, further comprising at least one attachment member affixed to the chassis front end to which the stabilizer bar and the grille system may be attached.

6. The front end assembly of claim 5, wherein the at least one attachment member comprises three spaced apart slip plane brackets.

7. The front end assembly of claim 1, wherein the chassis front end includes a radiator support.

8. The front end assembly of claim 1, wherein the chassis front end includes outer fender attachments.

* * * * *